United States Patent [19]

Black et al.

[11] Patent Number: 4,496,829

[45] Date of Patent: Jan. 29, 1985

[54] BANG-BANG DUAL-MODE INTEGRAL CONTROLLER WITH PROPORTIONAL CONTROL OUTPUT USEFUL FOR TEMPERATURE CONTROL

[75] Inventors: Arthur G. Black, Boulder; John H. Dodge, Thornton; Larry M. Ernst, Boulder, all of Colo.

[73] Assignee: International Business Machines Corporation, Armonk, N.Y.

[21] Appl. No.: 448,661

[22] Filed: Dec. 10, 1982

[51] Int. Cl.³ ............................................. H05B 1/02
[52] U.S. Cl. .................................. 219/497; 219/216; 219/501; 323/235
[58] Field of Search ............. 219/490, 491, 497, 499, 219/501, 216, 505, 494; 307/117, 116, 231, 236; 323/234, 241

[56] References Cited

U.S. PATENT DOCUMENTS 3,878,358  4/1975  Barton et al. .................. 219/216
3,924,170  12/1975  Foster ............................ 318/561
4,300,037  11/1981  Padder ........................... 219/498

Primary Examiner—M. H. Paschall
Attorney, Agent, or Firm—Carl M. Wright; Earl C. Hancock

[57] ABSTRACT

Control system which measures overshoot or undershoot time of a controlled variable with respect to a set value and adjusts a proportional count if the overshoot or undershoot time period exceeds fixed values. The proportional count is used to control the system output in a proportional manner, such as supplying k out of every n cycles of power, where k represents the proportional count. To prevent excessively long periods of overshoot or undershoot, an overlimit detector provides adjustments of the proportional count when the overshoot or undershoot measured time exceeds an overlimit value.

The control system has general applicability but is described in the temperature control of a fuser hot roll such as used in electrophotostatic copiers.

6 Claims, 7 Drawing Figures

BANG-BANG DUAL-MODE INTEGRAL CONTROLLER WITH PROPORTIONAL CONTROL OUTPUT USEFUL FOR TEMPERATURE CONTROL

TECHNICAL FIELD

This invention relates to fedback type controllers, and particularly, to feedback controllers employing input saturation (bang-bang) with proportional output.

Although described in detail as applied to the control of the fuser roll temperature in electrophotostatic copiers, the invention is useful in many other situations which require close control of system outputs and in which the feedback sensing element, used for generating the error input signal to the controller, produces a saturated signal. The latter condition is typical of temperature control systems.

The problems that arise from heating copier fusers, living spaces, and in other entities, such as found in manufacturing processes, are common in that they arise from trying to maintain a constant temperature in the presence of disturbances such as heat leakage, delay between the consumption of the fuel and the consequent change of temperature, and sensing the temperature of the heated device, process, or space.

The usual approach to temperature control is to sense the temperature relative to a set value. When the temperature is less than the set value, heat is applied to the system from a heat source. The heat is applied until the temperature rises above the set value, at which point the heat source is removed and the temperature begins to drop. There is a maximum and minimum resulting temperature. No matter how small the temperature range, i.e., the difference between the maximum and the minimum temperatures, there is always some variation in temperature at the sensor. There must be a temperature change to activate the sensor, else it would be always on or always off. The smaller the range, the more the system cycles, i.e., the more on- and off-switching of the source is performed per unit time. This can be wasteful of energy, especially in systems where start-up or shut-down require large surges of additional power. For example, fast start-up requirements may use large full power output levels.

The greater the range, however, the less constant the temperature. In a living space, there will be a period at a temperature higher than that necessary for comfort and, for another period, a temperature lower than that for comfort. In institutions such as hospitals, the minimum temperature must be maintained high enough for the well-being of the inhabitants (patients) so that the average temperature will be higher than necessary.

The heat control problem is further complicated by the fact that heat leakage is proportional to the temperature. At higher temperatures, the heat loss increases and wastes more fuel. This is another reason it is desirable to limit the range of temperature variation.

BACKGROUND ART

A "bang-bang" controller is defined in optimal control theory as one operating in accordance with the control law under saturation constraints in which every control variable takes its maximum or minimum allowed value according to whether the sign of its coefficient is positive or negative. For example, the state-space representation of a single-input, single-output system is $$x'(t) = Ax + bf(t)$$

$$y(t) = c(tr)x$$

where
 $x'(t) = dx/dt$ vector,
 $c(tr) =$ transpose of c-vector,
 A is a matrix, and
 $f(t)$ is the input value.

In a bang-bang control system, the value of $f(t)$ would take on its maximum or minimum values according to its sign.

An example of such a system is the common thermostatically-controlled heating system found in most homes. The input values would be represented by 1 or 0, depending on whether the temperature were lower or higher, respectively, than the value set on the thermostat. When the temperature drops below the value set on the thermostat, the input value $f(t)$ is 1, represented by a switch closure, which turns on the furnace. When the temperature rises above the value set on the thermostat, the switch opens representing $f(t)$ as 0 and causing the furnace to shut off. In actual practice, a small magnet is used to hold the thermostat's bi-metal switch closed until the temperature rises several degrees above the temperature setting. This prevents the system from excessive "hunting," i.e., short-period cycling around the set value.

The thermostatically-controlled furnace is also an example of a feedback control system having a first-order lag term. This term represents the time delay between the turning on of the thermostat switch and the rise in temperature resulting from the consequence of turning on the furnace. First, there is a time delay for the heat source to heat the plenum in the furnace to a sufficiently high temperature before turning on the circulating fan. Next, there is another delay for the heated air to be circulated in the space being heated sufficiently to raise its temperature.

Although one of the easiest systems to understand, the bang-bang control system is the most difficult to analyze. Nonlinear design techniques include modeling or graphic procedures, or both. A bang-bang controller is usually presented graphically by trajectories that are caused, by manipulation of the system parameters, to approach as fast as possible some optimal point, e.g., the origin of the complex plane.

An example of a bang-bang servo system is disclosed in U.S. Pat. No. 3,924,170.

Linear control systems contain controllers that are classed as proportional, integral, or derivative, or any combination of the three. These are well known in the art as are the advantages and disadvantages of each for particular applications. An advantage of integral control systems is that they produce a signal that is proportional to the time integral of the input of the controller. In terms of transfer functions, it is equivalent to the addition of a zero on the negative real axis and a pole at the origin of the complex s-plane. It increases the order of the proportional system by one and reduces a constant steady-state error to zero, if the system is stable. On the other hand, it can make a higher-order system unstable if the point on the negative real axis of the complex s-plane of the added zero is not chosen correctly.

Proportional output controllers are also well known in the art. For example, U.S. Pat. No. 3,878,358 shows an output that is varied proportional to the instantaneous error in the desired output temperature. (It does not, however, measure the time duration of the temperature oscillation which is an important feature in the invention being disclosed.) Proportional output can be performed by varying the duty cycle of an output pulse train or by varying the number of total pulses (or cycles) in a fixed time frame.

DISCLOSURE OF THE INVENTION

In accordance with the invention, there is provided a time base measurement which is compared to one of two provided limit values. The time measurement is made between threshold crossings of a controlled variable in a control system. If the crossing results in an overshoot, a proportional count is incremented if the period of undershoot, represented by the time base measurement, is greater than the provided lower limit. The proportional count is decremented if the crossing results in an undershoot and the time base measurement is greater than the upper limit. The proportional count is then used to control the system output in a proportional manner during the undershoot period.

The control system so disclosed has the advantages of the simplicity of bang-bang controllers and yet approaches the precise control associated with proportional output systems.

As described for controlling the temperature of a fuser hot roll in an electrostatic type copier, the invention is particularly useful in small copiers, especially if controlled by a programmed microprocessor, for keeping the fuser temperature closely controlled. This results in consistently good copy quality.

The combination also results in an adaptive-like controller.

DETAILED DESCRIPTION

Figure 1:
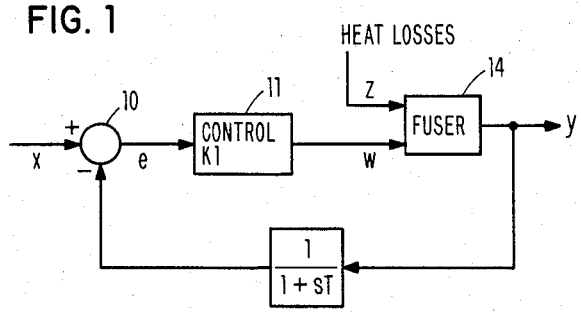
FIG. 1 is a block diagram of the control system of the class of which the invention is a member.

The standard configuration of a feedback control system is shown in FIG. 1. The controlled device is depicted as a fuser hot roll 14 of the type used in an electrophotostatic copier. A controller 11 supplies control signals to the fuser to control its temperature, represented as the output variable y. The controller transfer function is shown as K1, which is well known to be usually a function of s, depicted in the complex s-plane.

The input signal to the controller 11 is an error signal, e, from an adder/substractor 10. The error signal is derived from a set-point signal, x, sometimes known as the reference input, and a signal derived from the output variable, y. The derivation can provide unity feedback, i.e., the output signal y itself. In FIG. 1, the feedback is shown as y(1/(1+sT)) where the sT value indicates that there is a first-order time lag between the output signal y and the signal fed back to the adder/subtracter 10.

Heat losses can also be accounted for in the system of FIG. 1 and are depicted as an input variable z to the fuser. The other input to the fuser 14 is the signal w which represents the heat supplied by the controller 11.

In classical control theory, the controller's transfer function is usually proportional, i.e., w=K1*e, or integral, i.e., dw/dt=k1*e. (The symbol * is used herein to denote multiplication.) If the heat losses, called system disturbances, are denoted by K2*W/K, i.e., are considered proportional to the amount of heat supplied, then the system, with proportional control, is stable with $$y=(K1*x-K2*z)/(K1+K2).$$

With an integral controller, there is a natural frequency in the system that is proportional to the value K2/(Q*sqrt 2).

In the case of a bang-bang controller, however, the performance of the system becomes nonlinear and not susceptible to analytic techniques.

Figure 2:
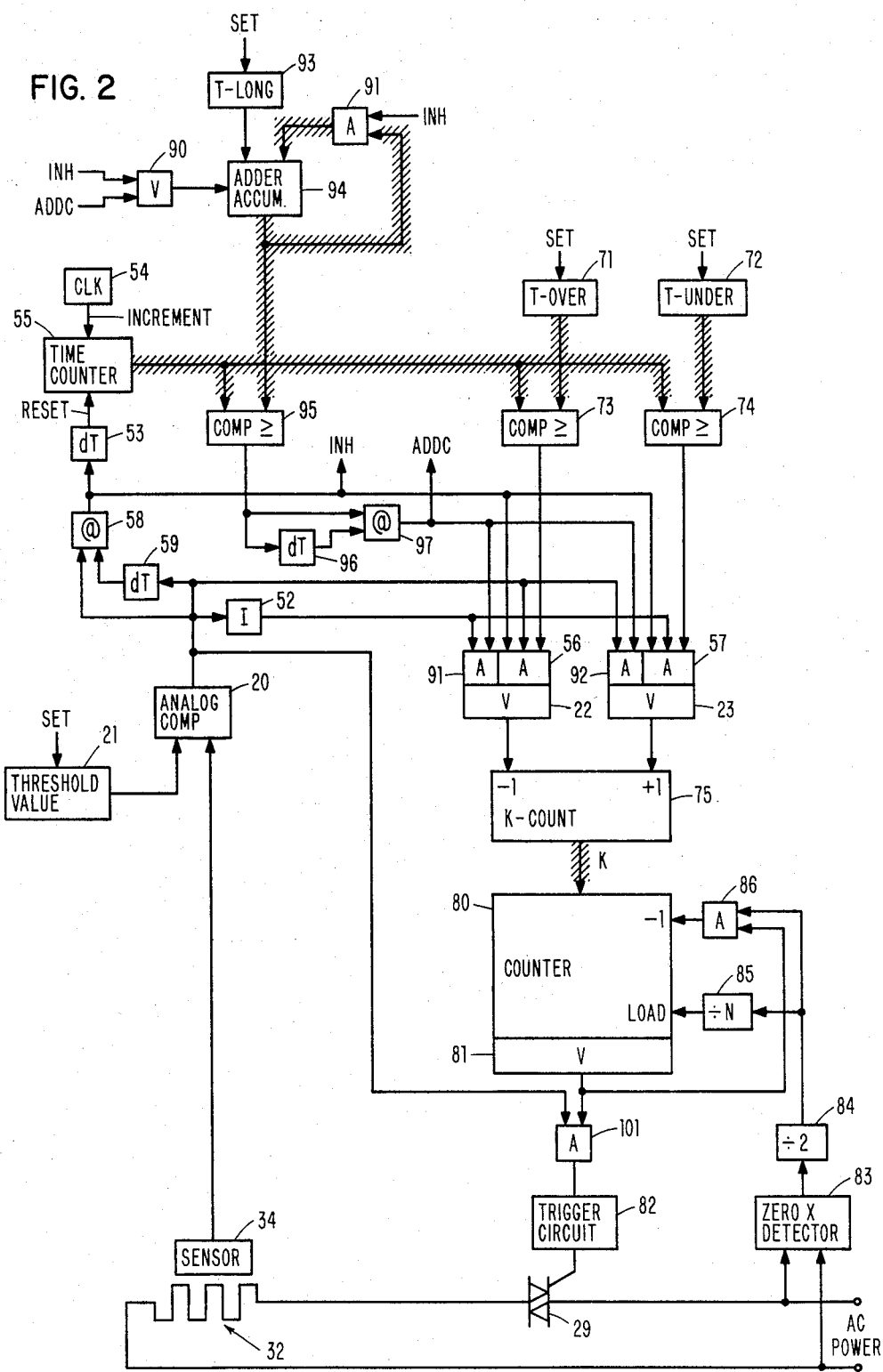
FIG. 2 is a logic diagram of a hardware embodiment of the invention.

A system according to the invention is shown in FIG. 2. Whereas the classical controller approach uses analog values, this approach uses predominantly digital values. The operation of the system of FIG. 2 can be generally considered to control the on-off period of a triac 29 which in turn controls the supply of AC power to a fuser heater 32. The basic idea is to provide upper and lower time limit values, and the time period between successive threshold crossings of the controlled variable, in this case, the temperature of the fuser hot roll, is measured. (Crossing is defined herein to mean when the value of the controlled variable changes in such a manner that, if it were previously lower than the threshold value, it becomes higher than the threshold value, or that if the value of the controlled variable were previously higher than the threshold value, that it changes such that it is lower than the threshold value.) In other words, if the value of the controlled variable were subtracted from the threshold value, or vice versa, a crossing occurs when the sign of the result changes. If the time period that the temperature is lower than the threshold value is greater than a predetermined limit (t-under), then a k-count value is incremented. If the time period that the temperature is greater than the threshold value is greater than a predetermined limit (t-over), then the k-count value is decremented.

During the time period when the temperature is below the threshold, proportional power is applied to the fuser heater 32 according to the ratio k/n, where k is not greater than n. Proportional output is defined here to mean an output that is some fraction or proportion of its possible maximum. It can be expressed as a ratio which represents an output level that is some fraction of its maximum possible value, the width of a pulse which is some fraction of its maximum possible width, or the number of pulses or cycles supplied out of a given number of successive pulses or cycles. The latter is used in the system being described. That is, out of each n successive cycles of AC power, k are supplied to the heater. When k=n, full power is being applied. When k=0, no power is being applied.

From the above general description, it is seen that the input variable, or set-point x, is the threshold value and that the sensed temperature is the controlled variable, y. The resulting error signal, e, is one of two possible values, indicating whether the value of the controlled variable (temperature) is greater or less than the input variable (threshold value). For this reason, the system is called a bang-bang controller type.

The output signal is a proportional signal that integrates the system performance over a period of time, i.e., an integral controller.

The operation of the system according to the invention as shown in FIG. 2 will now be explained in detail. AC power is applied to the fuser hot roll heater 32 when the triac 29 is triggered. A sensor 34 detects the temperature of the fuser hot roll to supply a feedback signal to the control system.

Figure 4:
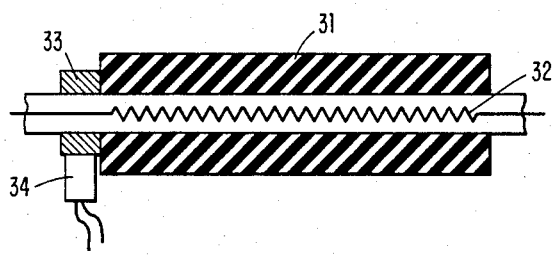
FIG. 4 is a cut-away view showing the principal parts of a fuser hot roll.

The details of a typical fuser hot roll are shown in FIG. 4. The hot roll is basically a flexible material forming the roller portion 31. A heating element 32 is disposed on the inside of the roll portion 31 to impart heat thereto. A metal sleeve 33 is affixed to the roller and thermally coupled thereto. A follower 34, made typically from carbon, graphite, or similar material, is arranged so as to rub on the metal block 33 while the roller 31 is rotating. Encased in the follower 34 is a heat sensing device such as a thermistor. As a result of this arrangement, a signal representing the temperature of the hot roll 31 can be supplied while the roller 31 is rotating.

There is some unavoidable time delay between the heating of the roller 31 and the consequent temperature change sensed by the thermal device in the follower 34. This time delay is responsible for the overshoot and undershoot in the temperature of the roller 31 when using conventional temperature control systems.

As shown in FIG. 2, the sensor 34 supplies an analog signal representing the sensed temperature of the fuser hot roll to an analog comparator 20. The other input to the analog comparator 20 is a signal representing a predetermined threshold value, which may be stored in a register 21.

Figure 3:
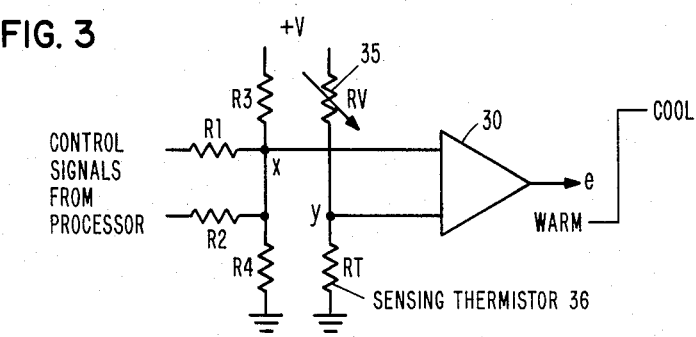
FIG. 3 is a schematic of an input sensor especially suited for use with the invention.

A circuit suitable for the analog comparator 20 is shown in detail in FIG. 3. An operational (high-gain, high input impedance) amplifier 30 is coupled to receive an inverting input and a noninverting input.

Because of the extremely high gain of the operational amplifier, typically 80 dB, a small voltage difference, e.g., one millivolt, between the two input values will cause the output signal to rise or to fall to a high (positive) or low (negative) value which is limited by the power supply voltages.

The y input voltage originates from a voltage divider comprising two resistances 35 and 36. The resistance 36 can be a thermistor or similar device for sensing the temperature of the fuser hot roll as described above. The other resistance 35 is commonly made variable to permit adjustment of the operating point of the comparator.

The x input is typically a reference voltage. As shown in FIG. 3, it can be a voltage divider having control inputs to permit changes to be made to the x, or threshold, voltage. If, for example, the control signals are supplied as either $+V$ or ground and the values of the resistors R1, R2, R3, and R4 are equal, the threshold voltage, x, can be varied to equal $V/4$, $V/2$, $3V/4$ selectively supplying the control input voltages. The inverting and noninverting amplifier inputs are connected so that when the temperature of the fuser hot roll is below the desired threshold value, the output signal from comparator 20 is at a high value, and when the temperature is above the desired threshold value, the output signal from the comparator 20 is at a low value.

The output signal from the comparator 20 is converted to a pulse by a pulser circuit comprising an Exclusive-OR gate (XOR) 58 and a delay circuit 59. When the output signal from the comparator 20 changes value, the XOR 58 produces an output signal for a time period equal to the delay constant of the delay circuit 59, at which the XOR input terminal coupled to the delay receives the same polarity signal as its other input terminal.

The time counter 55 is periodically incremented by the output signal from a clock circuit 54. The clock frequency and the number of bits in the time counter 55 are chosen, as is well known in the art, depending on the precision and maximum time period desired. The counter value provides the time base for the operation of the system.

The XOR output signal primes two AND gates 56 and 57 and resets a time counter 55. The time counter reset signal is delayed by a delay circuit 53 so that the output signals from the AND gates 56 and 57 will not be adversely affected by a premature resetting of the time counter 55.

Two sources of time limit values 71 and 72 supply binary over and under time limit values, respectively. Over and under refer to maximum desired times for the temperature overshoot and undershoot, respectively. The bits of each value are coupled as an input signal to one of a pair of binary comparators 73 and 74. Each comparator produces an output signal if the value of the time counter 55, the bits from which are coupled as the other input signals to the comparators 73 and 74, exceeds the value in the associated over or under limit source. The output signal from the analog comparator 20 primes the AND gate 56 and the complement of the output signal is supplied by an inverter 52 to prime the AND gate 57. The output signals from the AND gates 56 and 57 decrement or increment, respectively, a k-counter 75 via OR gates 22 and 23. The value in the k-counter 75 determines the proportion of the output signal from the system, i.e., k/n, as will be explained below.

By the logic circuits just described, the k-count is incremented at a threshold crossing from a lower level by the sensed temperature of the fuser hot roll, if the timer period indicated by the value from the time counter 55, is greater than (or equal to) the predetermined under limit value 72. The increment of the k-count is performed by the output signal from the AND gate 57 when the temperature crossing occurs (output signal from XOR 58), when the comparator 20 output signal indicates that the fuser hot roll was less than the threshold (output signal from the inverter 52), and when the comparator 74 is producing an output signal.

The k-count is decremented in a similar manner when the output signal from the comparator 20 indicates that the sensed temperature was greater than the threshold temperature. (For proper operation, it is important to note that, after the crossing, the output signal from the comparator 20 indicates the sensed temperature relation existing after the crossing.)

The value in the k-counter 75 is transferred to a counter 80 to control the proportion of the AC power signal supplied to the heater during successive n cycles. The counter 80 has its output signals decoded by an OR network 81 to produce an output signal that indicates that the contents of the counter 80 are not zero. The nonzero output signal from the OR network 81 operates a trigger circuit 82 to turn on triac 29 for each half-cycle of the applied AC power as long as the counter 80 contains a nonzero value. An AND-gate 101 permits the triac circuit to be turned on only while the fuser hot roll temperature is below the threshold value.

A zero-crossing detector 83 produces an output signal for each half-cycle of the AC power input. A divide-by-two counter 84 produces an output signal for each cycle of the input power, and these output signals from the divider 84 are used to decrement the contents of the counter 80. When the count value reaches zero in the counter 80, the AND gate 86 is disabled so that the counter 80 does not count through its zero value. The OR network 81 is no longer activated and turns off the trigger circuit 82, turning off the triac 29 so that no further AC power is supplied to the heater 32.

When n power cycles have been counted via a divide-by-n counter 85, the value of k is again loaded into the counter 80 and k out of n cycles of AC power are again supplied to the heater 32.

The above description of the circuit of FIG. 2 shows the control logic for providing a proportional output signal adjusted according to the time periods that the sensed temperature is over and under a threshold value.

There is a possibility that the roll temperature could be such that there will be an inordinate time period between successive crossings. This may be especially true if the AC line voltage were to drop during fuser operation. To reduce overly long periods without a crossing, an overlimit detection logic circuit is provided.

An overlimit value (t-long) 93 is provided which is added into an adder-accumulator circuit 94. Since the accumulator's contents are initially zero, the initial value in the accumulator 94 will be the t-long value. Its value is compared to the value in the time counter 55 and, when the time counter value exceeds the t-long value, a pulse is produced by the signal from the comparator 95 via the pulser circuit comprising the delay 96 and the XOR 97. The pulse, via an AND gate 91 or 92, decrements or increments the k-count, respectively, depending on whether the temperature is over or under the threshold value. The same signal, labelled ADDC, activates the OR gate 90 to cause the adder 94 to add another t-long value into the accumulator 94. Thus, after another time period equals to the t-long value, the k-count will again be adjusted. This activates the value k when the sensed temperature is so far from the threshold as to cause a long delay between crossings, i.e., prevents the system from excessively long periods without a threshold crossing.

When a threshold crossing does occur, the output pulse from the XOR 58 supplies an INH signal, which, through the OR gate 90, causes the t-long value to be added once again into the accumulator but, via an AND gate 91, the accumulator value is not supplied to the adder. The result is that, at a threshold crossing, the accumulator is set to the t-long value.

Figure 5:
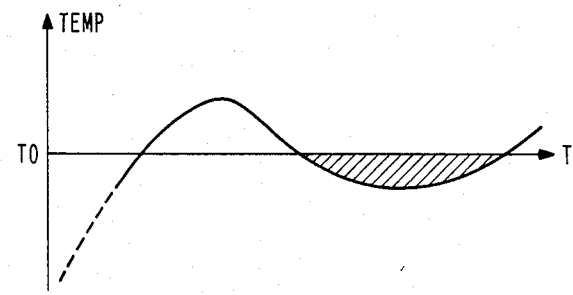
FIG. 5 is a graph of the temperature excursions in one embodiment of the invention.

The actual values of n, t-long, t-over, and t-under depend on the parameters of the particular system in which the invention is to be used. They can, however, be empirically determined. In one constructed embodiment, the values of t-over and t-under were chosen so that the time of excursion under the threshold was 17 seconds, over the threshold, 4 seconds. The t-long value was chosen to equal 34 seconds of time. The value of n was 16. The resulting temperature curve is shown in FIG. 5. Energy to provide heat was proportional to the shaded area under the threshold, To, line.

Figure 6:
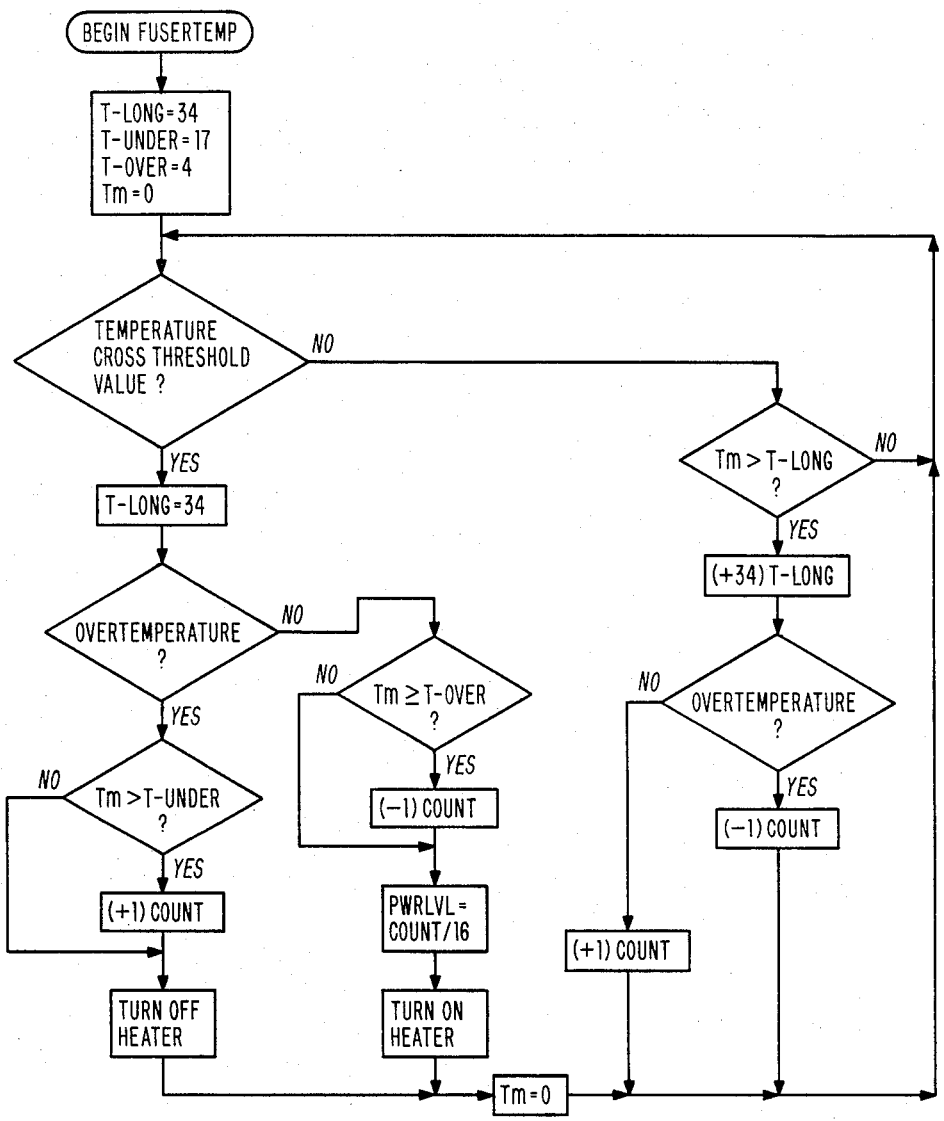
FIG. 6 is a flowchart of a program for practicing the invention in a system including a programmable controller processor.

A preferred embodiment of the invention uses a microcomputer suitably programmed to perform the functions of the components in the system of FIG. 2. A flowchart showing the program logic is illustrated in FIG. 6. For purposes of illustration, the program is depicted as a continuous looping program whereas in actual implementation, it would probably be a subroutine. An example of a suitable subroutine written in TYPICAL is provided below. The variables used in the program are:

TL = t-long;
TU = t-under;
TO = t-over;
TTL = time since last temperature crossing;
T1 = value of T this pass through subroutine;
T2 = value of T last pass;
k = proportional power level count;
n = basic number of power cycles; and
T = output from comparator, = 1 when the sensed temperature is below the threshold, = 0 when above.

. . .
TL = 34; TU = 17; TO = 4; FLAG = 0; k = n/2;
T2 = 0; T1 = 0; TTL = TL
. . .

1. enter FUSERTEMP subroutine
2. read input T
3. T2 = T1; T1 = T
4. read clock C
5. IF FLAG :=: 0 THEN C1 = C
6. CLK = CLK + C − C1
7. C1 = C
8. IF FLAG :=: 0 THEN FLAG = 1; return FIN
9. IF T1 :#: T2 THEN (CROSS) FIN
10. IF CLK :lt: TTL THEN return FIN
11. (+TL)TTL
12. IF T1 THEN (+1)k ELSE (−1)k FIN
13. return
14. CROSS: TTL = TL
15. IF T1 THEN (OVER) FIN
16. IF CLK :ge: TU THEN (+1)k FIN
17. (END)
18. OVER: IF T1 :gt: TO THEN (−1)k FIN
19. END: CLK = 0
20. end The values of TL, TU, TO, and n are predetermined according to the system parameters. Their values are set as an initial step in the program or can be permanently encoded in a read-only memory.

The reading of a clock value, C, is well known in the art. A clock circuit provides a binary or decimal count, representing elapsed time. The "read clock" statement makes this value available to the program as the variable C.

Figure 7:
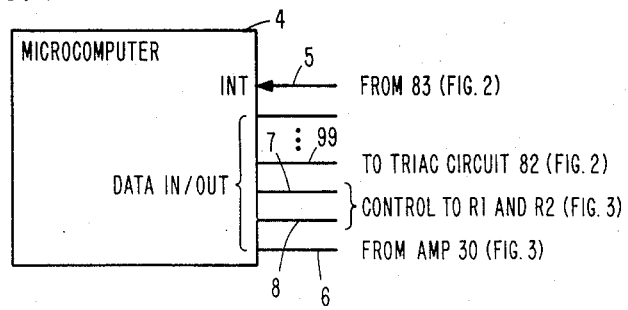
FIG. 7 is a block diagram of a microcomputer embodiment of the invention.

The use of the k-count to control the proportion of power to the fuser hot roll can be suitably implemented in an interruptible microcomputer 4 connected as shown in FIG. 7. Four of the data in/out lines are used as follows:

1. one line 6 receives the high (1) or low (0) signal, labelled T in the program, from the comparator shown in FIG. 3;
2. two lines 7 and 8 supply the control signals to set the threshold level of the comparator shown in FIG. 3 as explained above;
3. one line 99 provides an output signal to turn on the triac circuit;
4. another line 5 is an interrupt input (INT) line and causes the microcomputer to execute an INT subroutine.

The interrupt signal over line 5 is received from the zero-crossing detector 83 shown in FIG. 2. Since the interrupt occurs every half-cycle, the values of k and n can be doubled to eliminate the need for a divide-by-two counter.

A suitable INT subroutine is:
1. enter INT subroutine
2. (+1)nn
3. IF nn :=: 2*n THEN kk=2*k; nn=0 FIN
4. IF (kk :#: 0) & (T1) THEN write ON; ELSE write OFF FIN
5. (−1)kk; return
6. end The "write ON" statement causes the microcomputer 4 to supply a signal over the data line 99 to turn on the triac as shown in FIG. 2. The "write OFF" removes the signal.

The threshold control lines 7 and 8 can be used by another part of a control program to set the threshold for fast warm-up at power-on time or for other special requirements which need not be discussed in detail for an understanding of the invention.

The comparisons of greater than, greater than or equal to, and not less than have been used interchangeably. The operation according to the invention as described is not substantially affected by the inclusion or the exclusion of the equality case.

The program conventions used are explained in the appendix to this specification.

While the invention has been particularly shown and described with reference to a preferred embodiment thereof, it will be understood by those skilled in the art that the foregoing and other changes in form and details may be made therein without departing from the spirit and scope of the invention.

APPENDIX

SUMMARY OF TYPICAL

TYpable Program Integrated Code And Language

Each step
1. comprises one or more lines,
2. is consecutively numbered,
3. may contain more than one statement, if the statements are separated by semicolons,
4. may have a label, and
5. can be merely an unconditional branch designation.

Labels can be used to identify steps (lines) and must
1. extend at least two spaces to the left of the statements,
2. be followed with a colon, and
3. begin with a letter.

Definitions

A constant represents a fixed value.
A variable is the name of a changeable value.
An expression is a constant, variable, or a combination thereof related by operators.
A scaler is a single value.
A vector is a one-dimensional array.
A matrix is a two-dimensional array.
An element is a member of an array and is specified as a subscripted variable.

| The operators are | | |
|---|---|---|
| 1. Arithmetic | | |
| a. | addition | + |
| b. | subtraction | − |
| c. | multiplication | * |
| d. | division | / |
| e. | exponentiation | ' |
| f. | exponent of 10 | E |
| g. | exponent of 2 | B |
| h. | exponent of 16 | H |
| 2. Logical | | |
| a. | AND | & |
| b. | OR | v |
| c. | Exclusive-OR | @ |
| d. | NOT | ' |
| 3. Relational | | |
| a. | less than | :lt: |
| b. | less than or equal to | :le: |
| c. | greater than | :gt: |
| d. | greater than or equal to | :ge: |
| e. | equal to | :=: |
| f. | not equal to | :#: |
| g. | equivalence | :eqv: |
| h. | implication | :imp: |

The operation hierarchy is:
1. within parentheses;
2. logical operations in the following order
   a. NOT
   b. AND
   c. Exclusive-OR
   d. OR;
3. relational statements in order of occurrence;
4. arithmetic operations in the following order
   a. exponentiation
   b. multiplication and division
   c. addition and subtraction; and
5. left-to-right order with the preceding categories.

When a logical expression is evaluated for use in an arithmetic expression, it is assigned a value of one if the expression is true and a value of zero if the expression is false.

| Special Symbols: | | |
|---|---|---|
| ( ) | 1. | enclosing a step number or label, indicates a branch to the step. |
| | 2. | encloses the indices of a declared array or subscripted variable. |
| | 3. | indicates a modification to a following variable or register without changing its position. |
| | 4. | specifies the contents of an enclosed register. |
| (( )) | | designates the address of the enclosed variable. |
| A | | designates that the following literal is an absolute address. |
| I | | indicates that a following address is indirect. |
| a(n) | | designates the first n elements of a following array. |
| w(n) | | designates the last n elements of a following array. |
| e(n) | | designates a vector of n ones. |
| e(n)' | | designates a vector of n zeroes. |
| e(j,n) | | designates an n element vector having |

| Special Symbols: | |
|---|---|
| | n-1 ones with a zero in the j-th position. |
| e(j,n)' | designates an n element vector having n-1 zeroes with a one in the j-th position. |
| r | represents the number of elements in a following designated vector, matrix, or matrix row or column. |
| d | represents the number of dimensions in a following array. |
| X | indicates that a following literal string is represented in hexadecimal notation. |
| B | indicates that a following literal string is in binary notation. |
| BCD | indicates that a following literal string of decimal digits is represented in binary-coded decimal form. |
| X3 | indicates that a following literal string of decimal digits is represented in excess-3 notation. |
| % n=X % | indicates that n characters or n sequences of characters represented by X are to be inserted at the location in a literal string where the expression occurs. |
| / | 1. signifies that a preceding operator is applied to all the elements (or rows) of a following array. |
| | 2. encloses statements pertaining to input or output operations. |
| // | 1. signifies that a preceding operator is applied to all the columns of a following designated array. |
| | 2. encloses statements pertaining to manual or off-line operations. |
| | 3. indicates a conclusion deduced from preceding premise(s). |
| ' | 1. indicates concatenation of the preceding and following vectors. |
| | 2. serves as a general delimiter. |
| = | indicates that the value of the right-hand expression replaces the value of the left-hand variable(s). |
| ; | 1. separates statements on the same line. |
| | 2. separates indices of different dimensions. |
| : | 1. indicates a comparative test. |
| | 2. separates a label from the following statement. |
| | 3. serves as a general logical delimiter. |
| ? | follows and identifies a test statement. |
| " | encloses a string of literals. |
| ¢ | encloses comments. |
| * | 1. signifies the multiplication operation. |
| | 2. indicates present address. |
| — | 1. signifies the subtraction operation. |
| | 2. indicates the next address. |
| . | terminates the CASE statement. |

Upper case letters are usually used for variables, mnemonics, and the key words of the special statements.

Lower case letters are usually used for reserved words having a predetermined function.

Test Statements

A test statement is the equivalent of a decision block in a flowchart and can be either a logical test or a comparative test. A test statement is identified by a following question mark and parentheses enclosing an identifier of the step to which a branch is to be taken depending on the results of the specified test.

A logical test is expressed as a single logical variable or as an expression using any combination of arithmetical, logical, and relational operations. The parentheses following the question mark after the test indicates the step number or label to which a branch is to be taken if the test result is true. If the parentheses are followed by a NOT operator ('), the branch is taken if the test result is false. If the branch is not to be taken based on the test results, then the next statement in sequence is executed.

A comparative test is indicated by a colon separating a left-hand and a right-hand expression. The parentheses after the following question mark enclose three step numbers or labels separated by commas, being the branch destinations if the value of the left-hand expression is less than, equal to, or greater than the value of the right-hand expression, respectively.

Arrays and Indexing

Arrays are declared by name followed by the dimensions in parentheses. The initial and final index values, separated by a comma, are specified as a pair for each dimension, each pair being separated by a semicolon.

An element of an array, i.e., a subscripted variable, is specified by the array name followed by the indices of the element in parentheses and separated by semicolons.

Special Statements

Five special statements are included to provide greater facility and conciseness in the writing and reading of programs. These statements represent commonly used sequences of individual instructions that perform conditional functions or looping operations. The key words of the special statements are written in upper case letters.

In the following explanations, s1, s2, . . . , sn, sm represent statements or sequences of statements.

The special conditional statements are the IF-THEN and the CASE statements.

IF-THEN Statements

The form of the statement is
IF (condition) THEN s1 ELSE s2 FIN

The statement s1 is executed if the condition is true, and statement s2 is executed if the condition is false. The condition can be a single logical variable or a logical expression which is evaluated using the existing values of the variables.

The ELSE is optional and, if omitted, a false condition will cause the next statement in sequence following FIN to be executed.

FIN is used to terminate the statement since s1 or s2 can include more than one statement.

CASE Statements

The form of the statement is
CASE

```
:(condition 1): s1,
:(condition 2): s2,
    . . .
:(condition n): sn.
:ELSE: sm.
```

The conditions, starting with the first, are evaluated and the statement associated with the first true result is executed, the remaining statements being ignored even if associated with a true condition. Usually, however, the conditions are mutually exclusive.

The ELSE is optional. If none of the conditions is found to be true, the statement associated with ELSE is executed. If ELSE is omitted, the absence of any true condition causes the statement following the period, which terminates the CASE statement, to be executed. Commas are used to delimit the statements associated with each of the conditions.

The special looping statements are the WHILE-LOOP, REPEAT-UNTIL, and FOR-NEXT statements.

WHILE-LOOP Statements

The form of the statement is
WHILE condition s1 LOOP

The condition is evaluated and if true, the statement s1, terminated by the key word LOOP, is executed. This continues until the condition is false, at which time the statement following the key word LOOP is executed.

REPEAT-UNTIL Statements

The form of the statement is
REPEAT s1 UNTIL (condition)

The statement s1 is executed and the condition tested. If the condition is false, then the statement s1 is again executed. When the condition is true, the statement following the condition, which is delimited by colons, is executed.

In this statement, unlike the WHILE-LOOP, the statement s1 is executed at least once, regardless of the condition.

FOR-NEXT Statements

The form of the statement is
FOR (v)=(i) TO (f) BY (d) s1 NEXT

The variable (v) is set to an initial value (i). It is then compared to the final value (f). If the absolute value of (v) is not greater than that of the final value (f), the statements s1 are executed. The incremental value (d) is then added to the variable (v) and the comparison repeated. When the absolute value of (v) exceeds (f), the program continues with the statements following the terminating key word NEXT. (Absolute values are used in the calculations so that negative numbers can be specified.) The variable (v) is available for program use, e.g., as an index, but its value should not be altered.

The BY is optional. If not specified, the value of +1 is used for (d).

The key words of the special statements should be written on separate lines if the entire special statement cannot be written on a single line. Two key words should not otherwise be written on the same line. If a key word is not followed by an executable statement, then the line is not numbered.

Indentations may be used to improve readability of the program but too many indented spaces become a problem, especially when labels are used. The readability of programs can be improved by writing after the terminal key words, viz., FIN, LOOP, NEXT, and REPEAT, the step number of the initial related key word. Also, the terminal key word NEXT can be followed by the applicable variable name.

Reserved Words

These words are used only for convenience and are not required. Their use, however, makes a program easier to read and to understand.

begin,end identifies the starting and finishing lines of an in-line program module; begin is usually followed by a program name; end is always used to indicate the end of a module, subroutine, and so on.

call indicates a branch to a named out-of-line subroutine or function; parameters used by the subroutine are listed after the name of the called subroutine, the input and output variables being separated by a colon and the variables being separated by commas.

enter identifies the beginning of an out-of-line subroutine; it is usually followed by an identifying name with the parameters specified as noted for "call".

return indicates a final statement of an out-of-line subroutine and causes the program sequence to continue at the statement following the call statement that invoked the subroutine; there can be more than one return statement in a subroutine.

array indicates that the following named variables, separated by commas and terminated with a semicolon, are arrays.

integer indicates that the following named variables, arranged as noted for "array", are integer values and operations thereon are implied to be integer operations.

logical indicates that the following named variables, arranged as noted for "array", are logical values.

real indicates that the following named variables, arranged as noted for "array", are real numbers and operations thereon are implied to be real operations; mixed real and integer variables in an expression imply real operations.

complex indicates that the following named variables, arranged as noted for "array", are complex numbers and operations thereon are implied to be complex operations; mixed real and complex variables in the same expression imply complex operations.

field indicates that the following named variable is treated as a unit although its constituent variables, named in parenthesis, remain individually addressable.

origin indicates that the location counter is to be set at the specified value.

Reserved Functions

Certain functions are used frequently and may be written as in-line code in a module, as an inserted separate module, or as a subroutine. If the latter, writing the function in an expression is equivalent to calling it with the proper parameters which represent the arguments. Most of the functions are supplied with compilers.

The function name in an expression is replaced by the value calculated from the argument which can be a constant, a variable, an array, or an expression. If an array, each element of the argument array produces an element in a result array unless otherwise noted for the function. An argument written as an expression is evaluated to produce the argument.

The arguments for trigonometric functions are to be expressed in radians.

| | |
|---|---|
| entr(arg) | rounds argument off to nearest integer. |
| int(arg) | extracts the integer part of the argument. |
| frac(arg) | extracts the fractional part of the argument. |
| sin(arg) | sine of the argument. |
| cos(arg) | cosine of the argument. |

| | -continued |
|---|---|
| tan(arg) | tangent of the argument. |
| cot(arg) | cotangent of the argument. |
| sec(arg) | secant of the argument. |
| csc(arg) | cosecant of the argument. |
| hav(arg) | haversine of the argument. |
| deg(arg) | converts radian argument to degrees. |
| rad(arg) | converts degree argument to radians. |
| atn(arg) | arctangent of the argument. |
| asn(arg) | arcsine of the argument. |
| acs(arg) | arccosine of the argument. |
| gcd(arg1,arg2) | greatest common divisor of the arguments. |
| lcm(arg1,arg2) | least common multiple of the arguments. |
| abs(arg) | absolute value of the argument. |
| sgn(arg) | Signum function of the argument. |
| rem(arg1,arg2) | remainder of arg1 when divided by arg2. |
| sqrt(arg) | square root of the argument. |
| crt(arg) | cube root of the argument. |
| max(array) | maximum value in array. |
| min(array) | minimum value in array. |
| chg(arg1,arg2) | interchange arg1 and arg2. |
| log(arg) | common logarithm of the argument. |
| nln(arg) | natural logarithm of the argument. |
| exp(arg) | natural exponentiation. |
| sq(arg) | square of the argument. |
| fac(arg) | factorial of the argument. |
| gam(arg) | gamma function of the argument. |
| inv(arg) | inverse of the argument which must be a square matrix. |
| det(arg) | determinant of the argument which must be a square matrix. |
| tr(matrix) | transform of the matrix argument. |

What is claimed is:

1. A method of controlling an output signal as a function of time passage between events comprising the steps of:
setting predetermined upper and lower time limits;
supplying a proportional output signal determinative of a controlled variable;
generating a reference signal after the value of the controlled variable crosses a predetermined threshold value;
measuring the time period between successively generated reference signals;
increasing the proportion of said output signal if the measured time period that the value of said controlled variable is below said threshold value is not less than said lower time limit; and
decreasing the proportion of said output signal if the measured time period that the value of the controlled variable is above said threshold value is greater than said upper time limit.

2. The method of claim 1 wherein said generating step comprises the steps of:
sensing the value of said controlled variable;
comparing the sensed value of said controlled variable to a predetermined threshold value; and
producing said reference signal if the value of said controlled variable has crossed said threshold value.

3. The method of claim 1 wherein said measuring step includes the steps of:
supplying periodic clock pulses;
counting said clock pulses to supply a time base count;
comparing said time base count to one of said time limits in response to said reference signal; and
resetting said time base count to zero in response to said reference signal.

4. The method of claim 1 wherein said supplying step includes the step of maintaining a count controlling the proportion of the output signal.

5. The method of claim 4 including the step of:
controlling the supplying of the proportional output signal in accordance with said count value.

6. A control system comprising:
means for supplying an output control signal to a utilization system;
sensor means responsive to first and second input signals for supplying an output signal having one value when said first input signal is of a value exceeding that of the second input signal and having another value when said second input signal is of a value exceeding that of the first input signal;
timing means, responsive to the output signal from said sensor means, for supplying signals representative of the time duration between changes in the value of said sensor means output signals; and
means responsive to said timing means supplied signals for causing said output control signal supplying means to proportion said output control signal in relation to said time duration between said sensor means output signal changes.

* * * * *